United States Patent [19]

Hazelwood

[11] 4,404,787
[45] Sep. 20, 1983

[54] DENSITY CONTROL SYSTEM FOR TEA PACKAGING APPARATUS

[75] Inventor: Geoffrey Hazelwood, New Farnley, England

[73] Assignee: Baker Perkins Holdings Limited, Peterborough, England

[21] Appl. No.: 236,332

[22] Filed: Feb. 20, 1981

[30] Foreign Application Priority Data

Mar. 11, 1980 [GB] United Kingdom ............... 8008189

[51] Int. Cl.³ ............................................ B65B 57/14
[52] U.S. Cl. ..................................... 53/502; 53/553; 53/559
[58] Field of Search ................ 53/560, 559, 502, 553

[56] References Cited

U.S. PATENT DOCUMENTS

| | | | |
|---|---|---|---|
| 2,513,852 | 7/1950 | Donofrio | 53/560 X |
| 2,663,129 | 12/1953 | Donofrio | 53/560 |
| 3,038,282 | 6/1962 | Hansen et al. | 53/560 X |
| 3,418,140 | 12/1968 | Fisher | 53/559 X |
| 3,638,393 | 2/1972 | Datta | 53/559 |
| 3,786,844 | 1/1974 | Smearsoll et al. | 53/502 X |

*Primary Examiner*—Horace M. Culver
*Attorney, Agent, or Firm*—Watson, Cole, Grindle & Watson

[57] ABSTRACT

A machine for packaging tea includes a rotary dispensing drum having rows of circumferentially spaced pockets into which tea flows by gravity through outlets at the bottom of a hopper. The tea is deposited in piles from the pockets on a web of packaging material which travels in contact with the periphery of the drum. The portion of the hopper containing the outlets is movable in relation to the drum so as to vary the effective area of the outlets and therefore the size of the deposited piles of tea.

3 Claims, 6 Drawing Figures

DENSITY CONTROL SYSTEM FOR TEA PACKAGING APPARATUS

BACKGROUND OF THE INVENTION

1. Field of the Invention

This invention relates to machines for packaging free flowing solid materials, such for example as tea, of the type comprising a rotary dispensing drum having in its periphery a row of circumferentially spaced pockets, a feed hopper to contain the material to be packaged which is disposed above the drum and has an outlet at its lower end through which the material flows by gravity into successive pockets in the drum as the drum rotates, means for feeding a lower web of packaging material into contact with the periphery of the drum so that it covers the filled pockets and leaves the bottom of the drum in a substantially horizontal run carrying spaced piles of material deposited on the web from successive pockets in the drum, and means for superposing an upper web of packaging material on the lower web to cover the piles of material and sealing the webs together around the perimeter of each pile.

2. Description of the Prior Art

Machines of this type are described in British Patent Specification No. 938,337 (FIG. 4) and in U.S. Pat. No. 2,746,223 and are in commercial use for the production of tea bags.

During a production run of such a machine for producing tea bags there are inevitably changes during the run in the density of the tea being packaged. Since the weight of tea in the bags must remain constant this necessitates a compensating adjustment of the machine while it is running.

Hitherto such adjustment has been by means of plungers which are movable in unison into and out of the pockets to vary the volume of the pockets by an adjustment made by the machine operator whenever check weighing of the bags shows that such adjustment is necessary.

This procedure has two disadvantages. Firstly the mechanism required, which involves simultaneous and equal adjustment of the volume of all of the pockets while the machine is running, is extremely complex and expensive. Secondly the mechanism imposes a serious restriction on the speed at which the machine can be operated for the following reason.

When a plunger is advanced into a pocket to reduce its volume, each pile of tea deposited on the lower web has a crater at the top and the annular rim surrounding the crater is easily disturbed, if it is sought to run the machine at high speed, causing the tea to spread from the designated pile area into the zone at which the surrounding seal is to be made between the webs. Penetration of tea into this zone results in incomplete sealing and leakage of tea from the bags.

SUMMARY OF THE INVENTION

The invention provides a packaging machine of the above-described type, in which the lower portion at least of the hopper is mounted for sliding movement in relation to the drum so as to vary the effective area of the outlet from the hopper to the pockets in the drum. In this way the amount of material fed into the pockets from the hopper can be adjusted to vary the size of the piles without alteration of the size or shape of the pockets. A simple hand wheel adjustment can be provided for shifting the hopper parallel to the axis of the drum or the sliding movement can be imparted to the hopper automatically by a servo motor actuated by a check weigher trend controller which sends a signal to the servo motor whenever a change in density of the material is detected.

In one embodiment of the invention the drum has two rows of peripheral recesses, all identical in shape and volume. The hopper has two outlets, each communicating with one row of pockets. When the outlets are disposed centrally with regard to the pockets a maximum flow of tea into the pockets is achieved. On lateral shifting of the hopper the outlets are progressively blanked off to reduce the extent of filling of the pockets.

Since, even when the pockets are incompletely filled, piles of tea of regular shape are deposited on the lower web of packaging material the machine speed can be increased considerably without spreading of the piles. Thus a typical machine with plunger adjustment of the volume of the pockets can make only 750 deposits per minute per row of pockets whereas adjustment according to the invention enables the speed to be increased to over 1000 deposits per minute.

The machine can also be used for packaging other free flowing solid materials, such for example as salt, sugar and coffee. Though these materials are less subject to density variations than tea, adjustment of the hopper enables packages containing different amounts of the commodity to be produced.

BRIEF DESCRIPTION OF THE DRAWINGS

One embodiment of a machine according to the invention for producing tea bags will now be described in detail, by way of example, with reference to the accompanying drawings, in which.

DETAILED DESCRIPTION OF THE PREFERRED EMBODIMENT

Figure 2:
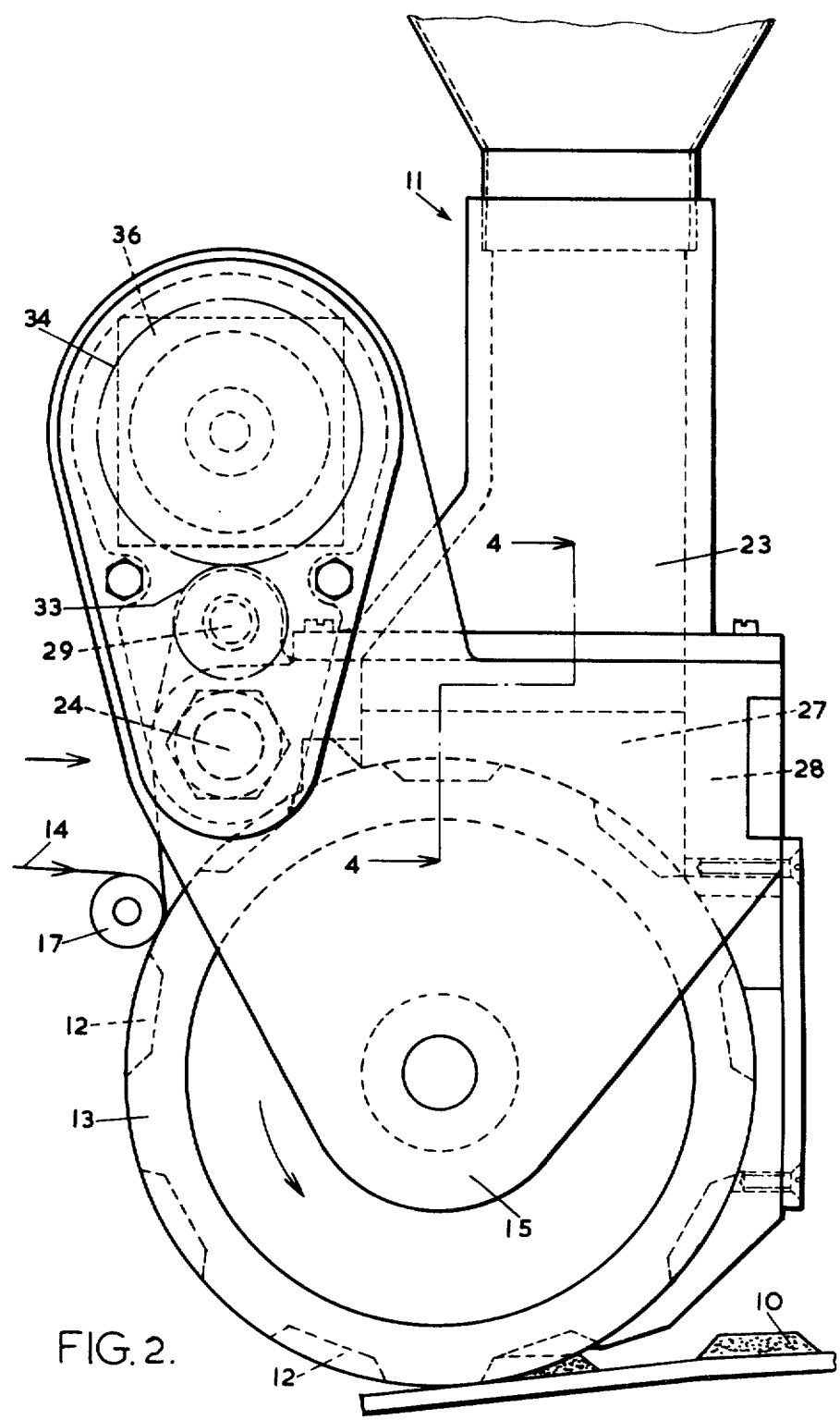
FIG. 2 is an elevation of a part of the machine shown in FIG. 1.
Figure 3:
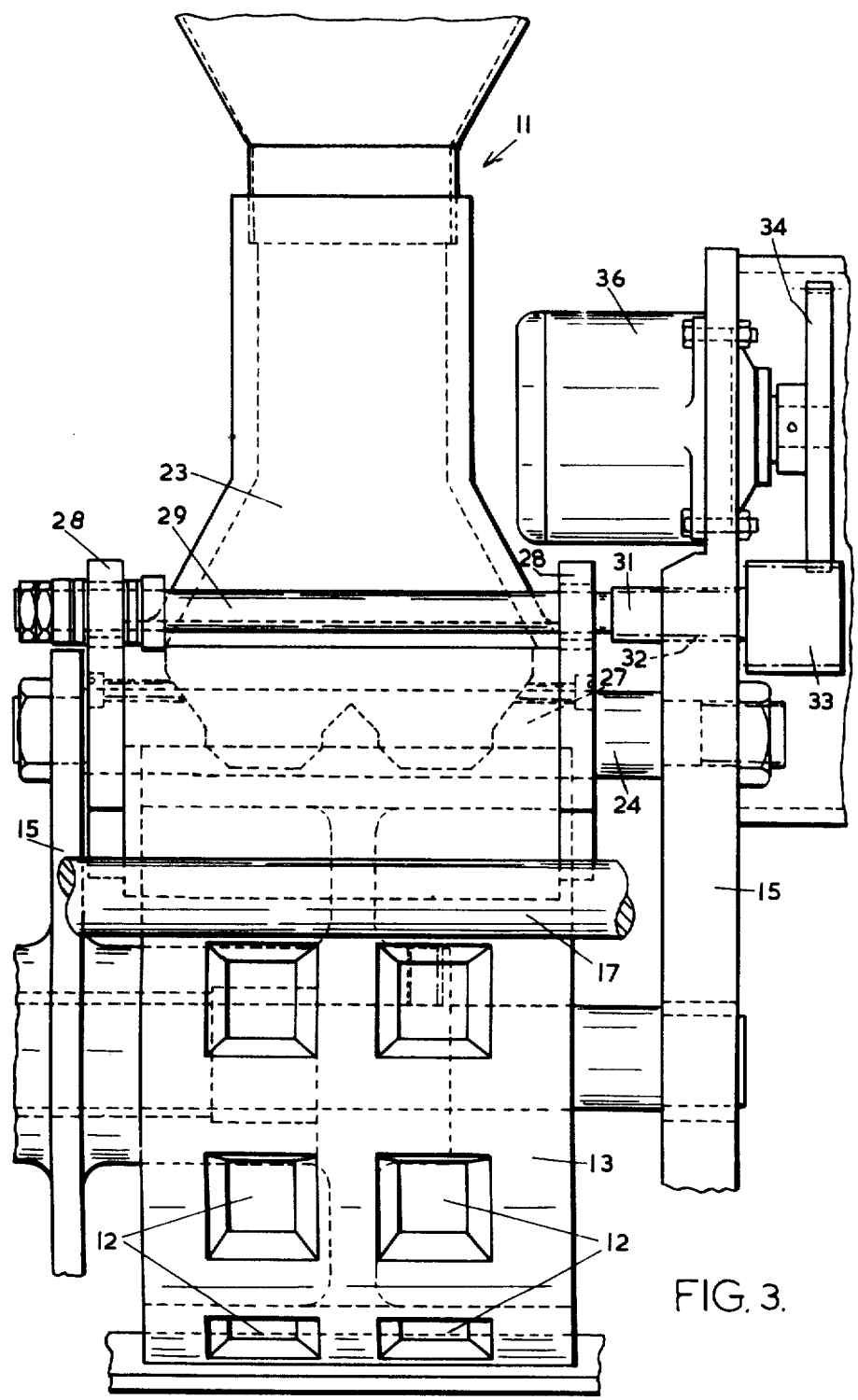
FIG. 3 is an end view in the direction of the arrow in FIG. 2.
Figure 6:
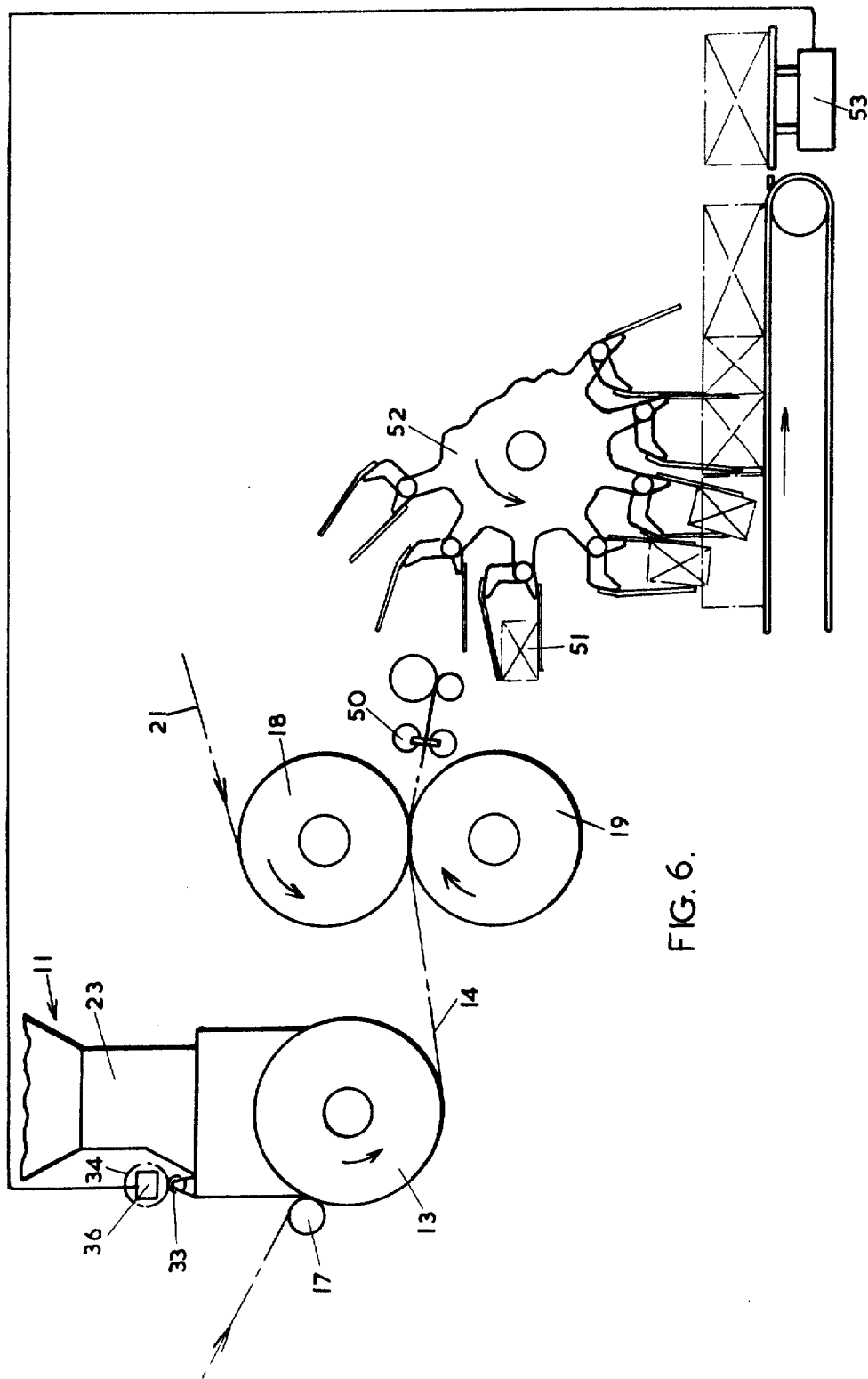
FIG. 6 is a diagram of the entire system of the present invention.

As shown in the drawings, the machine comprises a hopper 11, from which tea flows by gravity into successive pockets 12 formed in the periphery of a continually rotating drum 13 mounted in a framework 15 (FIG. 3). A lower web 14 of packaging material passes from a supply reel 16 over a roller 17 to engage the periphery of the drum 13 through an arc extending from the roller 17 to the lowermost point of the drum so that it covers the filled pockets 12 and leaves the bottom of the drum 13 in a substantially horizontal run carrying spaced piles 10 (FIG. 2) of tea deposited on the web 14 from successive pockets 12 in the drum 13, the web 14 then passing through the nip of a pair of upper and lower heated driving rollers 18 and 19 respectively. An upper web 21 of packaging materials passes from a supply reel 22 over the roller 18 and into contact with the lower web 14 to cover the piles of tea, the webs 14 and 21 being sealed together around the perimeter of each pile 10 as the webs pass through the nip of the rollers 18 and 19, the latter being provided with pockets (not shown) which align with the piles 10. As shown in FIG. 6 the chain of tea bags thus formed is then severed by a cutter 50 in known manner into individual bags, which are collated by a controller 51 into batches which are transferred into cartons by a cartoner 52 in the manner described in British Patent Specification No. 1,432,371. Upon completion of the cartoning operation the filled cartons pass to a known type of check weigher trend controller 53 for checking changes in the density of the tea being packaged.

The hopper 11 includes a fixed upper portion 23, which is secured to a rod 24 (FIG. 2) mounted in the framework 15, and a movable lower portion 27, which is secured to a pair of plates 28 (FIG. 3) attached to an adjusting spindle 29, which extends parallel to the axis of rotation of the drum 13 and has a screwed portion 31 which engages a threaded bore 32 in the framework 15. Secured to one end of the spindle 29 is a pinion 33 arranged in mesh with a spur gear 34 secured to the shaft of a servo motor 36 mounted on the framework 15.

Figure 1:
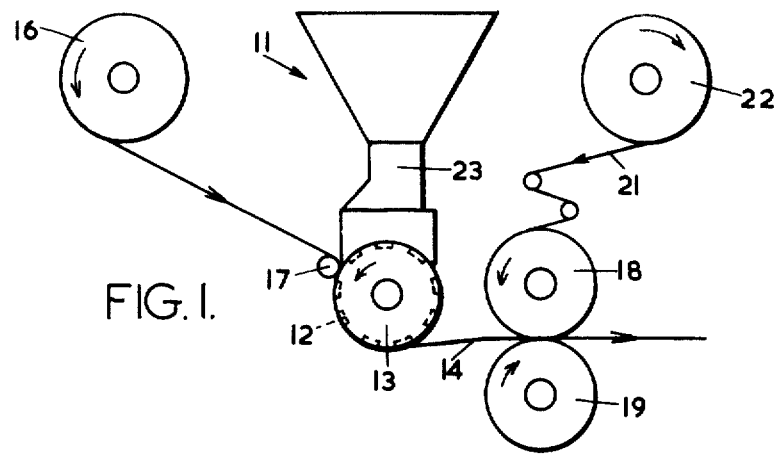
FIG. 1 is a diagrammatic illustration of the machine.
Figure 4:
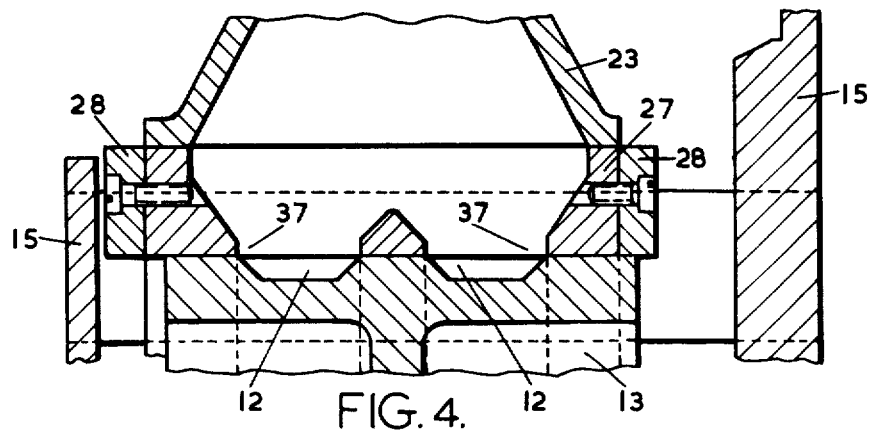
FIG. 4 is a section on the line 4—4 in FIG. 2.
Figure 5:
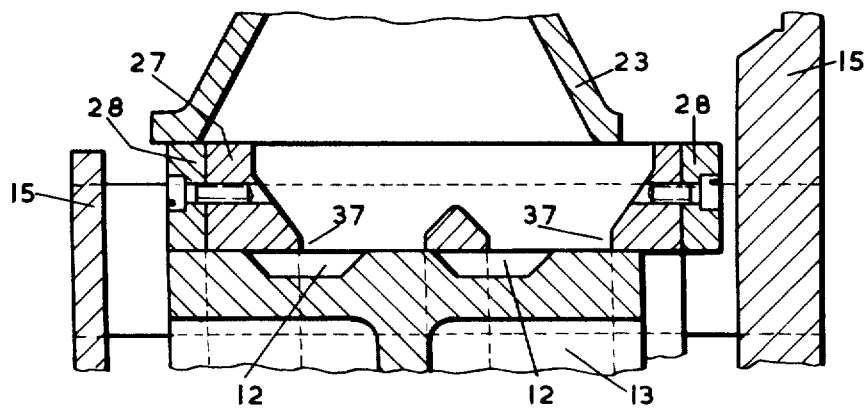
FIG. 5 is a similar view to FIG. 4 with part of the machine shown in an adjusted position.

The drum 13 is formed with two rows of peripheral pockets 12, all identical in shape and volume. The lower portion 27 of the hopper 11 has two circular outlets 37 each communicating with the pockets 12 of one row. When the outlets 37 are disposed centrally with regard to the pockets 12, as shown in FIG. 4, a maximum flow of tea into the pockets is achieved. When, however, a change in the density of the tea being packaged is detected by the check weigher 53 mentioned above, a signal is sent from the weigher to the servo motor 36 which rotates the spindle 29 through the gearing 33 and 34 for a corresponding number of revolutions, with the result that the screwed portion 31 moves the spindle 29 and the plates 28 in a direction parallel to the axis of the drum 13 to cause the lower portion 27 of the magazine to blank off portions of the pockets 12 and hence reduce the extent of filling of the pockets 12 as shown in FIG. 5.

Obviously, numerous modifications and variations of the present invention are possible in light of the above teachings. It is therefore to be understood that within the scope of the appended claims, the invention may be practiced otherwise than as specifically described herein.

I claim:

1. A machine for packaging tea or other particulate solid material comprising a framework, a rotary dispensing drum mounted for rotation in the framework and having in its periphery a row of circumferentially spaced pockets, a hopper to contain the material to be packaged which is mounted in the framework and has a lower portion which contains a permanently open outlet through which the material flows by gravity into successive pockets in the drum as said drum rotates, the lower portion at least of the hopper being normally stationary but slidable when required in the framework in relation to the drum to vary the effective area of the outlet to the pockets and therefore the extent of filling of the pockets, means for imparting such sliding movement to said lower portion at least of the hopper, means for feeding a lower web of packaging material into contact with the periphery of the drum so that it covers said pockets in succession after they have received material from said hopper through said outlet and leaves the bottom of the drum in a substantially horizontal run carrying spaced piles of material deposited on the web by gravity from successive pockets in the drum, and means spaced laterally from said drum for superposing an upper web of packaging material on the lower web to cover the piles of material carried by and traveling with said lower web and sealing the webs together around the perimeter of each pile.

2. A machine according to claim 1, which includes a servo motor operable automatically in response to changes in density of the material to impart corresponding sliding movement to the hopper.

3. A machine according to claim 2, in which the lower portion of the hopper is attached to a spindle, which extends parallel to the axis of rotation of the drum, has a threaded portion engaging a threaded bore in the framework and is geared to the servo motor for rotation thereby.

* * * * *